A. B. BRODIE.
CONTAINER AND DISPENSING DEVICE.
APPLICATION FILED AUG. 17, 1910.
1,013,120.
Patented Jan. 2, 1912.
2 SHEETS—SHEET 1.
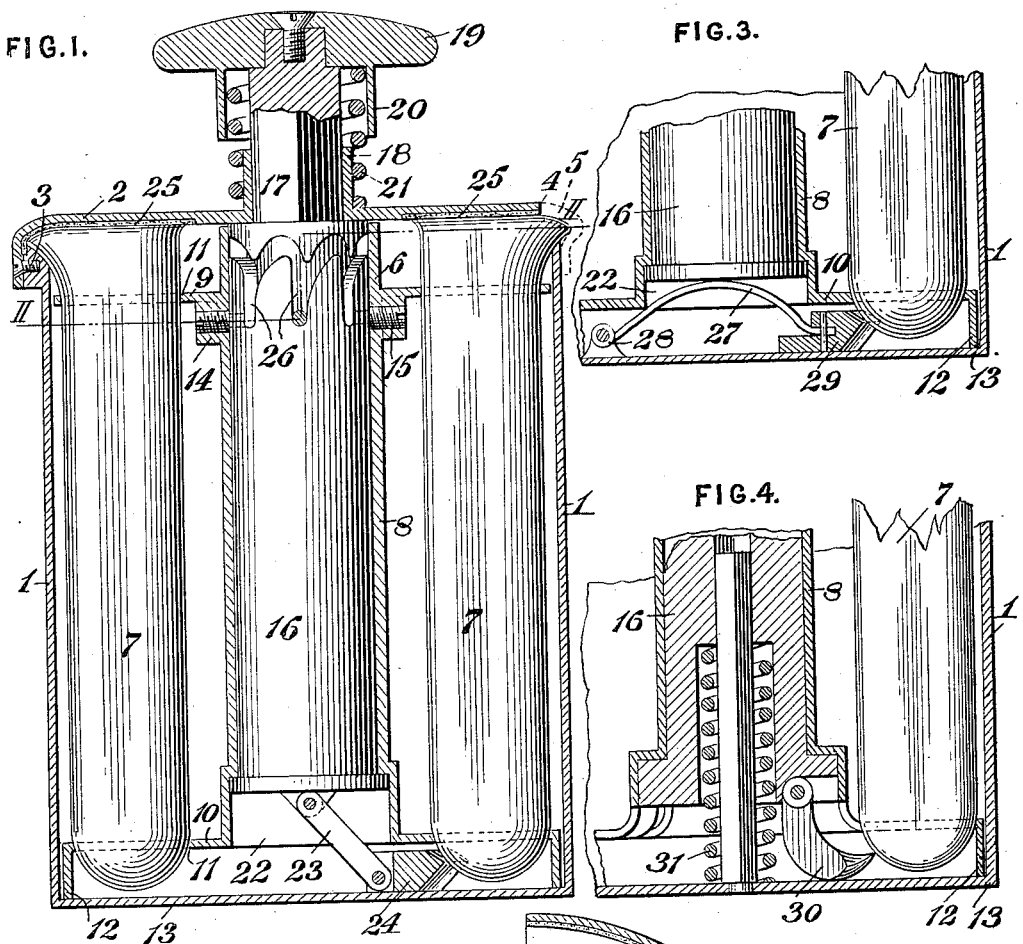

A. B. BRODIE.
CONTAINER AND DISPENSING DEVICE.
APPLICATION FILED AUG. 17, 1910.
1,013,120.
Patented Jan. 2, 1912.
2 SHEETS—SHEET 2.
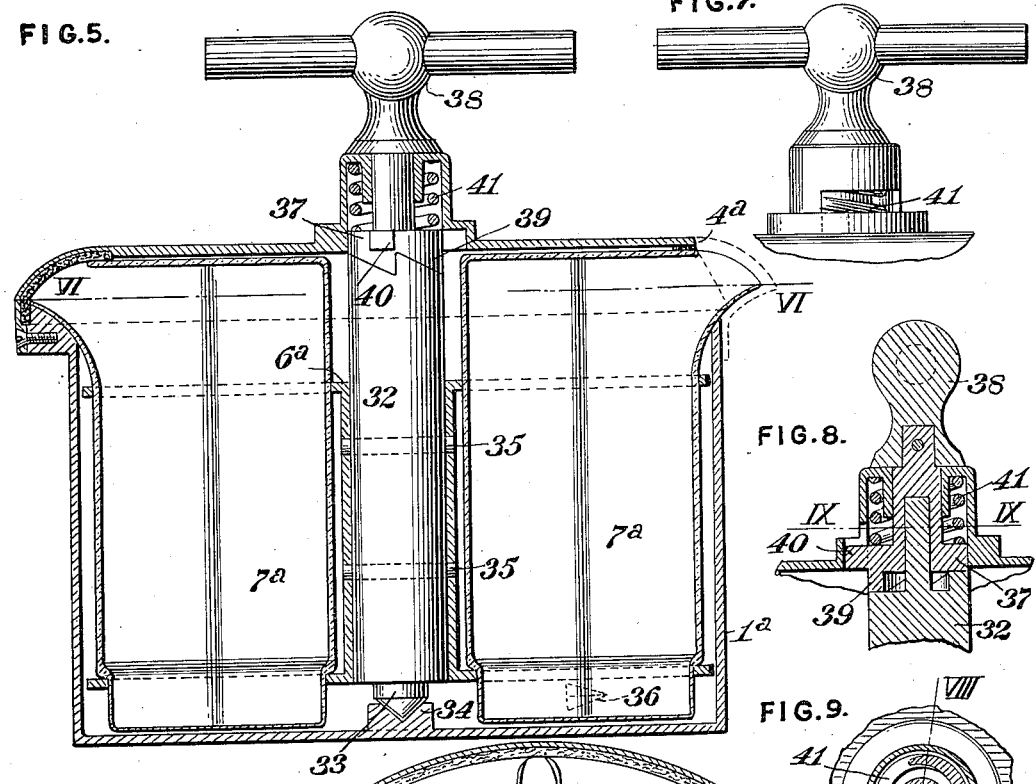
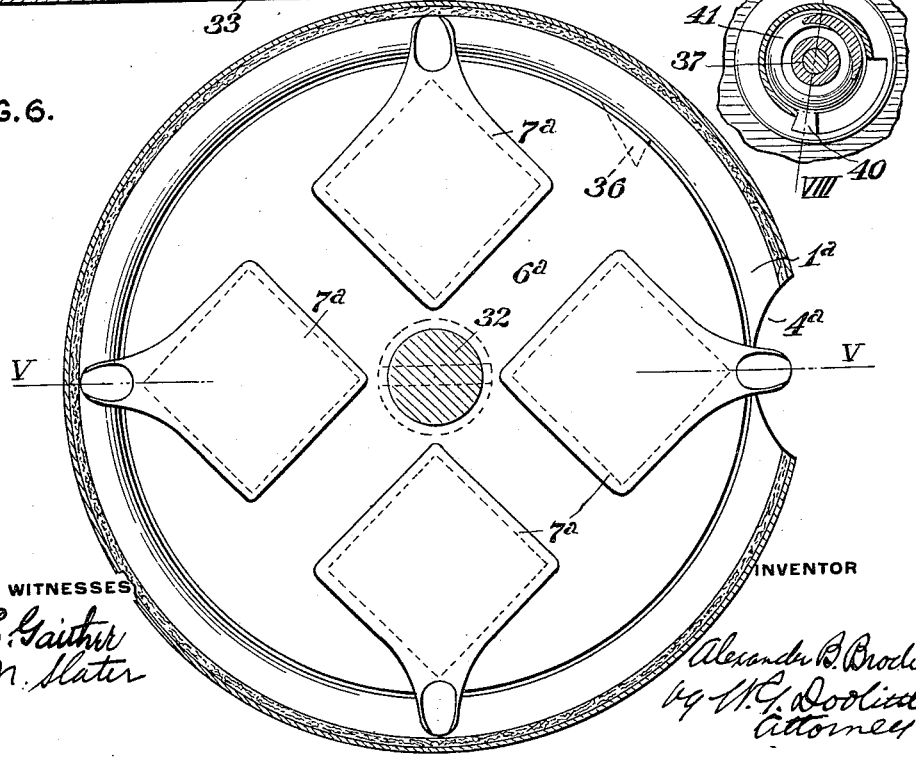

UNITED STATES PATENT OFFICE.

ALEXANDER B. BRODIE, OF PITTSBURGH, PENNSYLVANIA.

CONTAINER AND DISPENSING DEVICE.

1,013,120.  Specification of Letters Patent.  Patented Jan. 2, 1912.

Application filed August 17, 1910. Serial No. 577,714.

*To all whom it may concern:*

Be it known that I, ALEXANDER B. BRODIE, a resident of Pittsburgh, in the county of Allegheny and State of Pennsylvania, have invented certain new and useful Improvements in Containers and Dispensing Devices, of which the following is a specification.

The prime object of my invention is to provide a new and improved container and dispensing device particularly designed for preventing the refilling of a receptacle or receptacles after the original contents have been removed.

In the embodiments of my invention as illustrated by the accompanying drawings, I have shown devices of the character mentioned particularly adapted for holding and dispensing liquids, but my invention is not limited to a device for holding liquids only, as the contents to be held and dispensed may be solids.

In the accompanying drawings, which illustrate applications of my invention, Figure 1 is a central vertical sectional view of a container and dispensing device embodying my invention; Fig. 2 a horizontal sectional view of the form of Fig. 1 taken on line II—II of Fig. 1; Fig. 3 a detail sectional view of a modified construction for breaking the receptacles, and Fig. 4 a similar view showing a still further modified construction; Fig. 5 a central vertical sectional view of a modified form of device constructed in accordance with my invention, the section being taken on line V—V of Fig. 6; Fig. 6 a horizontal section of the form of Fig. 5 taken on line VI—VI of Fig. 5; Fig. 7 a detailed elevational view particularly showing operating handle of the form of Fig. 5; Fig. 8 a central sectional view of operating mechanism taken on line VIII—VIII of Fig. 9; and Fig. 9 a horizontal section taken on line IX—IX of Fig. 8.

Referring to the drawings, 1 designates a casing made of any suitable material and provided with a removable cover 2 secured thereto by small screws 3 or by other suitable means. Casing 2 should be provided with a delivery outlet through which the contents to be dispensed are passed and in the form of casing illustrated I cut away a portion of the upper edge of the same as shown at 4 to form the delivery outlet. Extending over the outlet 4 and secured to the casing and to the cover thereof is a readily removable cap or closure 5.

Located within the casing and adapted to be moved therein is a rotatable member, carrier or rack 6 designed to hold a plurality of receptacles 7 in which the material to be dispensed is held. As illustrated the movable member 6 comprises a tubular centrally disposed member 8 and two horizontal apertured plates 9 and 10; the openings 11 of said plates being designed to receive the receptacles 7. Lower plate 10 is provided with an annular depending flange 12 designed to rest upon the base 13 of the casing and the tubular portion immediately below the upper plate 9 is provided with a series of internally threaded members 14 each adapted to receive a partially threaded pin 15.

Located in the tubular member 8 and adapted for vertical movement therein is a rod or plunger 16. Member 16 is provided with an upper square end portion 17 located in a square opening of the cap formed by flanges 18 thereon and mounted on the end of portion 17 is a knob 19. Knob 19 has a depending flange 20 between which and the portion 17 and between the under face of the knob and the cover is a spring 21, the latter being for normally maintaining the member 16 in a raised position relatively to the bottom of the casing. The bore of the tubular member 8 is enlarged as indicated at 22 and operable in this enlarged portion is a pivoted arm 23; said arm being pivotally connected with the lower end of member 16 at one end and to a member 24 at its other end.

Interposed between the upper ends or the openings of the receptacles 7 and the cover 2, I provide a pad 25 for closing the openings of the receptacles.

Formed in the plunger 16 are a series of cam likes grooves 26 and into the grooves the pins 15 project. Said grooves coact with the pins for imparting a rotary movement to the rotatable member on which the several receptacles are carried upon a vertical movement of the plunger 16, it being understood, that the plunger 16 owing to its square portion 17 will not have a rotary movement. In the form of Fig. 1 the grooves are adapted to coöperate with the pins so that upon a downward and an upward movement of member 16 the receptacle supporting member will turn one-eighth of a revolution or sufficiently to move one receptacle out of register with the delivery outlet of the casing and move the succeeding receptacle into register therewith.

Assuming that a receptacle is in register with the outlet of the casing and that the contents thereof have been removed, a downward stroke imparted to the plunger 16 will cause the plunger to descend and move member 24 against the receptacle, breaking or destroying said receptacle and owing to the movement of the rotatable member carrying the receptacles effected by means of the grooves and pins above described, the destroyed receptacle will be moved away from the casing outlet and a succeeding filled receptacle moved into register therewith.

In the form of Fig. 3 the plunger rests upon a flat spring 27 which is secured at one end to the bottom of the casing as shown at 28 and is provided at its other end with a breaking member 29.

Fig. 4 shows a still further modified form of means for destroying the receptacles; in this form I secure a breaking-member 30 to the lower end of the plunger and provide a spring 31 at the lower end of the plunger instead of at the top as in the form of Fig. 1.

In both of the forms of Figs. 3 and 4, the groove and pin construction for moving the receptacle carrying member is retained.

In the embodiment of my invention as shown by Fig. 5, the movable receptacle carrying member 6ª is substantially the same as the member 6 of the form of Fig. 1, but in this construction, this member is secured to and is designed to turn with a rotatable member 32 supported in a casing 1ª by a projecting portion 33 resting on a block 34. 35 designates pins for securing the tubular portion of the member 6ª to member 32. In this form of my invention I have shown a fewer number of receptacles 7ª and of a different shape than those shown in the form of Fig. 1, but said receptacles are provided with an outlet and are designed to be successively brought into register with the casing outlet 4ª and successively destroyed after the contents thereof have been removed. The means for destroying or breaking the respective receptacles in this form consist of a fixed member 36 against which the receptacles are carried. The means for moving the receptacles into position to remove the contents thereof and to break said receptacles comprise a ratchet connection between member 32 and a member 37, and the construction illustrated is designed to revolve member 32 and the carrier 6ª one-fourth of a revolution in one direction only upon turning said member 37 by means of the hand grip 38. The construction shown comprises ratchet teeth formed on the upper end of member 32 coacting with similar teeth 39 on member 37. Member 37 is also provided with a lug 40 adapted to limit the forward movement of member 37. A spring 41 is provided for returning member 37 to the next engaging position with the member 32 after the pressure on the hand grip has been released.

What I claim is:

1. In a container and dispensing device the combination with a casing having a delivery outlet, of a plurality of receptacles each having a discharge opening, means for causing the opening of each receptacle to successively register with the delivery outlet of the casing, and means for successively destroying each receptacle.

2. In a container and dispensing device the combination with a casing having a delivery outlet, of a plurality of receptacles adapted to contain a liquid, a movable frame on which the receptacles are mounted, means for moving the frame, and means for destroying the receptacles.

3. In a container and dispensing device the combination with a casing having a delivery outlet, of a rotatable carrier, a plurality of receptacles each having a discharge opening carried on the carrier, means for rotating the carrier to successively bring the opening of each receptacle into register with the delivery outlet of the casing, and means for destroying each receptacle after its contents have been removed.

4. In a container and dispensing device, the combination with a casing having a delivery outlet, of a plurality of receptacles each having an opening, means for causing the opening of each receptacle to register with the delivery outlet of the casing, and means for successively destroying the receptacles.

In testimony whereof I affix my signature in presence of two witnesses.

ALEXANDER B. BRODIE.

Witnesses:
W. G. DOOLITTLE,
F. E. GAITHER.

---

Copies of this patent may be obtained for five cents each, by addressing the "Commissioner of Patents, Washington, D. C."